Figure 1:
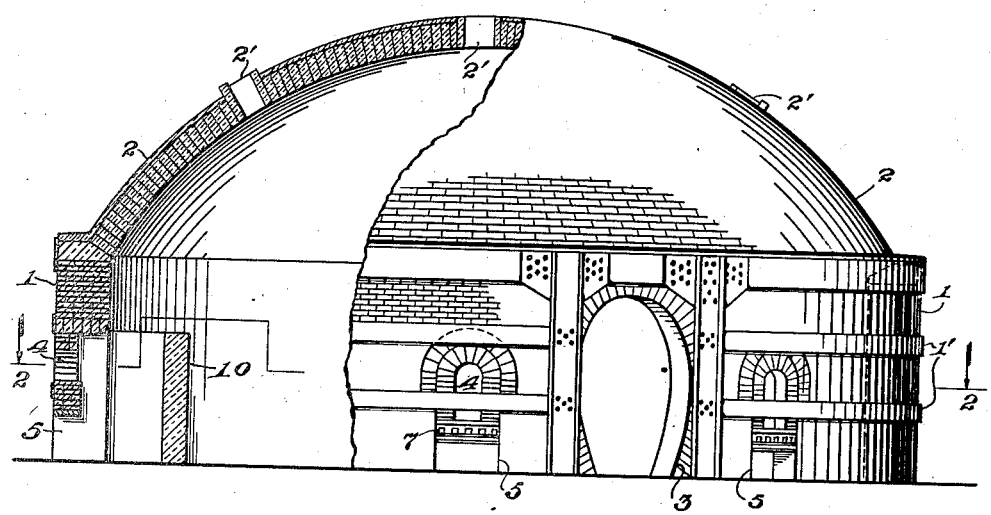

INVENTORS
Fred M. Miller,
Alfred C. Shape,
William H. McClelland,
BY
ATTORNEY

INVENTORS
Fred M. Miller,
Alfred C. Shape,
William H. McClelland,
BY
ATTORNEY

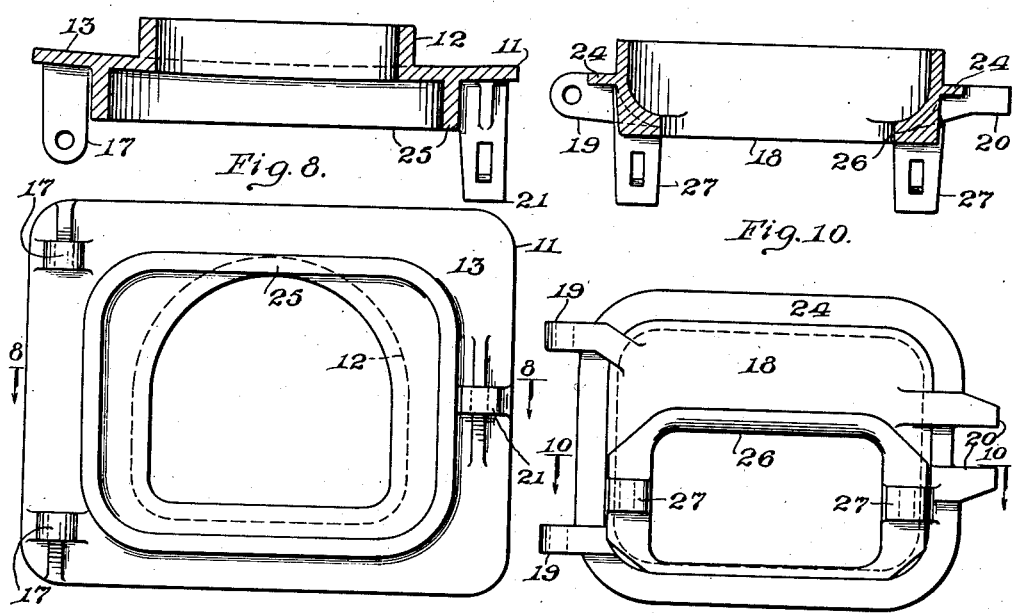
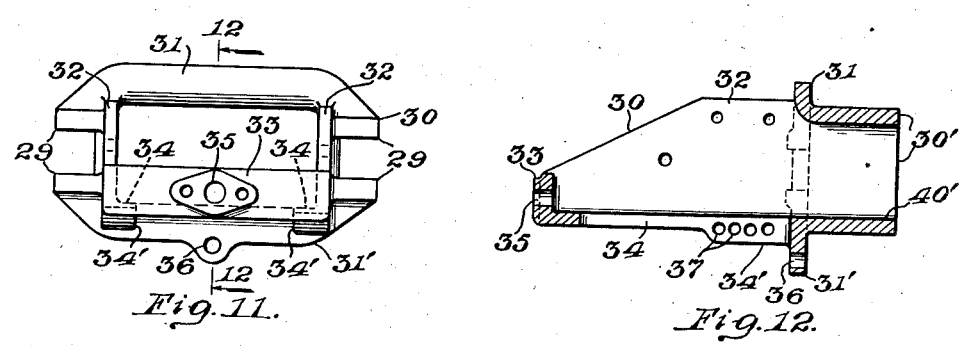
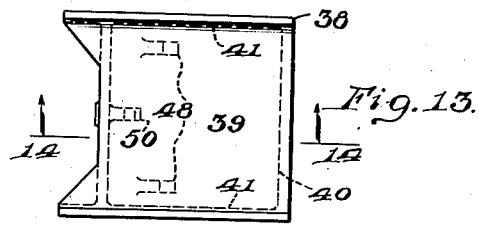
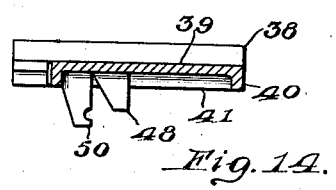

Patented Sept. 11, 1945

2,384,762

UNITED STATES PATENT OFFICE 2,384,762

MECHANICAL STOKER FOR KILNS AND THEIR MOUNTINGS

Fred M. Miller, Bala-Cynwyd, Alfred C. Shape, Upper Darby, and William H. McClelland, Wynnewood, Pa., assignors to General Refractories Company, Philadelphia, Pa., a corporation of Pennsylvania Application May 29, 1943, Serial No. 489,258

2 Claims. (Cl. 110—32)

The object of the invention is to provide improvements in stokers especially adapted for use in firing kilns, such as those used in the manufacture of various ceramic products, though equally well adapted for use with many types of furnaces, when solid fuel is a prime consideration.

Another and more specific object is to provide a novel stoker, which is adapted to be operated in multiple by the simultaneous or predetermined sequential periodic application of pneumatic, hydraulic and/or electric power.

A further object is to provide a stoker which comprises a reciprocatory impelling member operative to push a predetermined quantity of solid or semi-solid fuel towards or into a kiln or furnace, together with adjustable means to variably limit the quantity of fuel fed at each stroke by and upon each impulse of said impelling member.

Still another object is to provide an improved mounting for the said stoker, comprising a fixed frame for the eye or firing aperture of the kiln, a closure either hingedly mounted or otherwise movable with respect to said frame, and means to detachably secure the stoker to said closure, it being understood that the broad idea includes movement of stoker and supporting door in either a rectilinear or curved path.

A still further object is to provide in such a composite structure a suitably mounted closure so shaped as to provide a chamber or recess, at least in its upper portion, in which brick or other form of heat-insulating material is securely positioned in order to protect from the direct heat of the kiln or furnace the coal and/or other fuel, which is temporarily held in a hopper, chute, or other form of container, while awaiting to be fed by said impelling member into said kiln or furnace.

And still another object is to provide in its broadest concept the combination of a receiving device of any sort having an entrance aperture, a movable closure for said aperture which of itself has an opening, and means for mechanically feeding substances through said closure opening towards said entrance aperture, said means being carried by said closure.

In the present case, the term kiln is employed to embrace any kiln, furnace, incinerator or other device to which a feeder or stoker is applicable, it being noted that not all feeders supply fuel to a fire. The term mortise-and-tenon structure, for want of a better expression, is employed to embrace any of the various types of mortise-and-tenons as such, overhanging hooks and lugs, either with or without wedges or equivalent separate locking elements, and all similar means whereby the stoker may be rapidly mounted upon and demounted from the kiln closure, as distinguished from screws, bolts and the like, which are relatively slow to operate even when new, and which under varying weather conditions and the heat of the kiln tend to rust quickly and thereby lose even their initial usefulness. The term stoker is employed to embrace all suitable forms of fuel-handling means and mechanisms by which solid, semi-solid or liquid fuel can be impelled or injected through the eye or firing aperture of a kiln for consumption therein, and to feeding means generally by which articles or substances are fed mechanically to another device, whether it be a kiln, furnace, packaging, processing or other type of mechanism.

Figure 2:
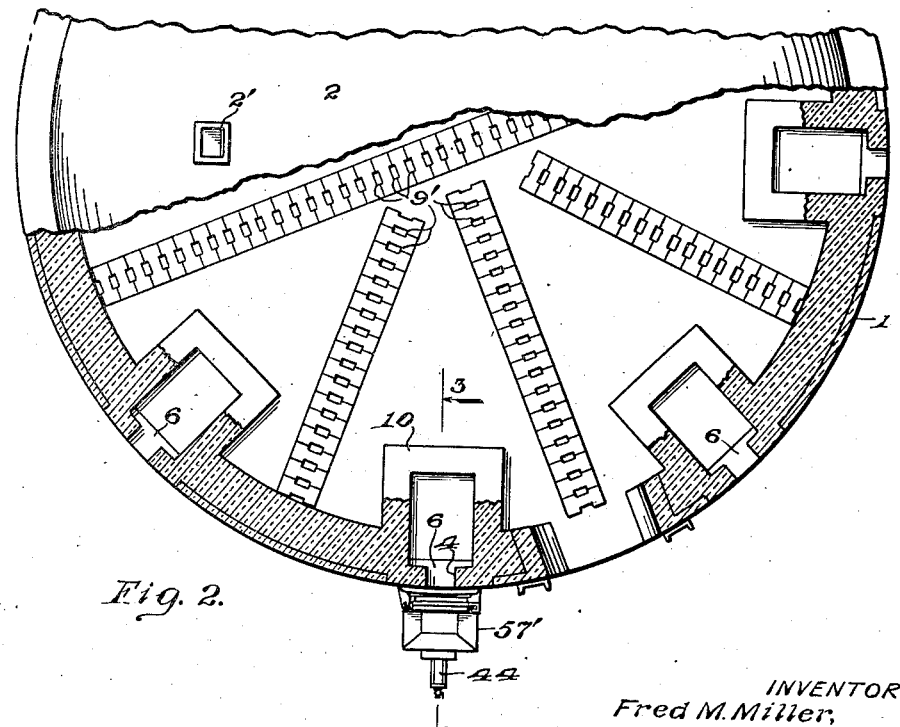
Figure 3:
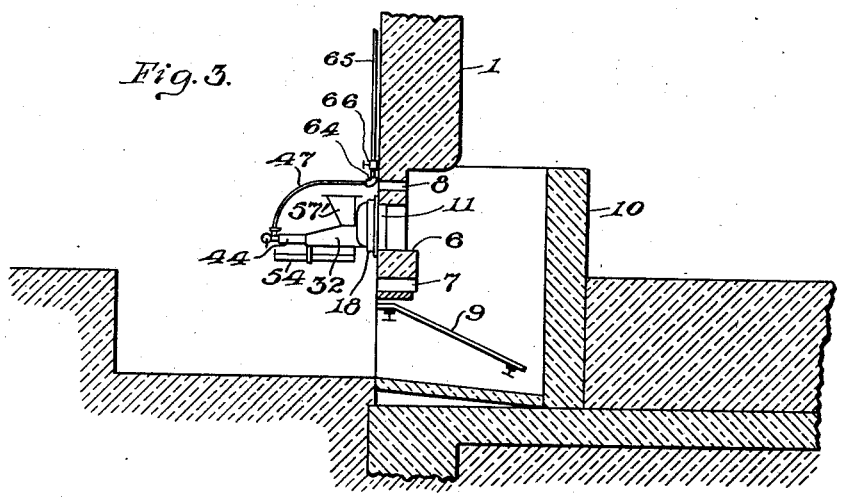
Figure 4:
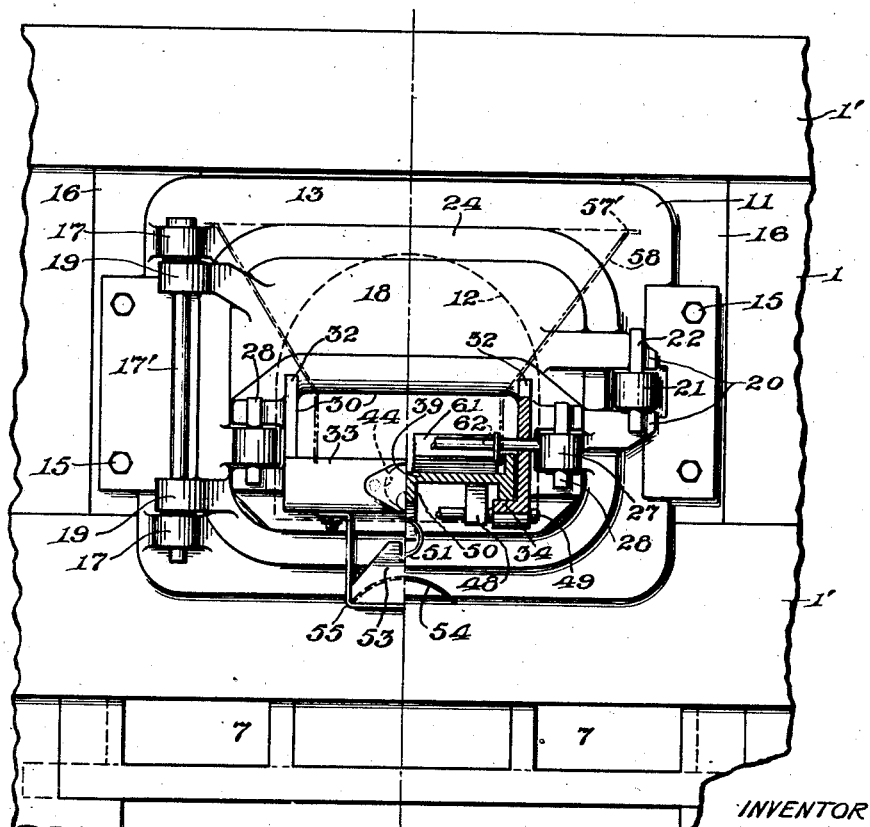
Figure 5:
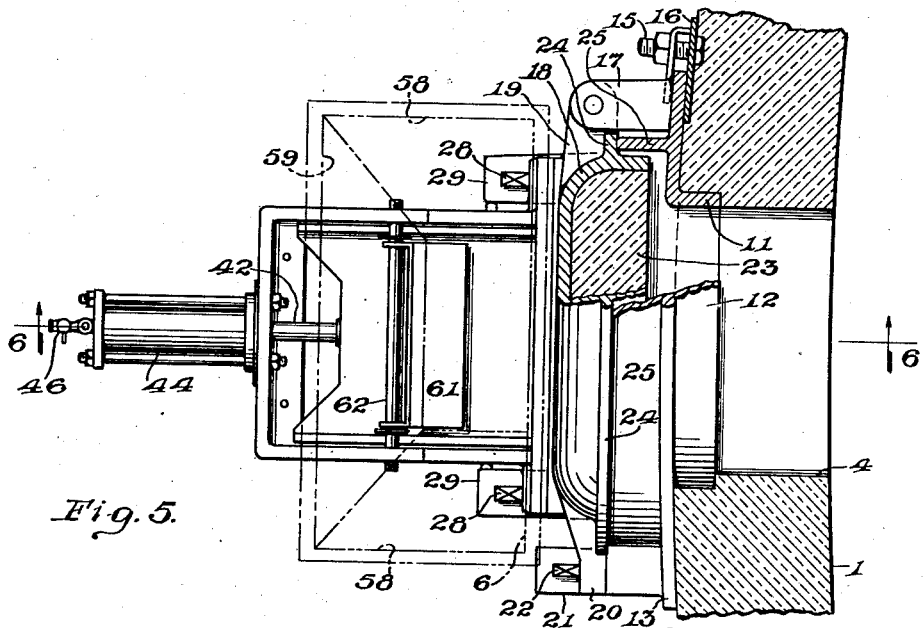
Figure 6:
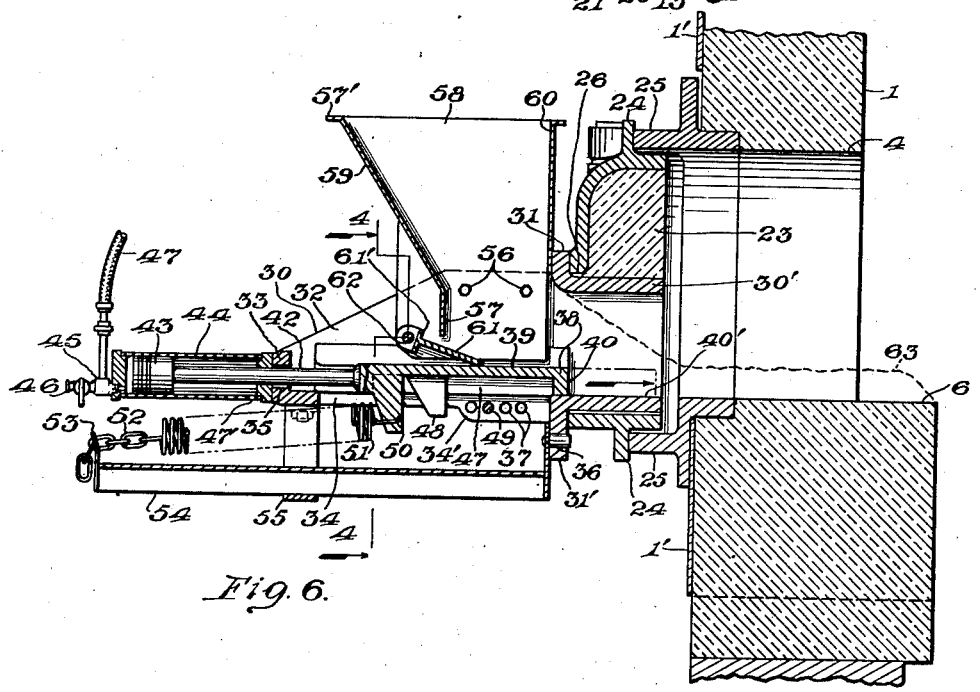

With the objects thus briefly stated, the invention comprises further details of construction and operation, which are hereinafter fully brought out in the following description, when read in conjunction with the accompanying drawings, in which Fig. 1 is an elevational view of a well known type of ceramic kiln, partially broken away to show its vertical cylindrical wall in section; Fig. 2 is a fragmentary top plan view of the same, similarly broken away to show portions of said vertical wall in horizontal section through several of the firing eyes at the levels indicated by the line 2—2 of Fig. 1; Fig. 3 is an enlarged fragmentary section on the line 3—3 of Fig. 2; Fig. 4 is a still further enlarged fragmentary view showing on the left hand side the improved stoker and supporting closure structures in elevation, and on the right hand side the stoker in section on the planes indicated by the line 4—4 of Fig. 6; Fig. 5 is a top plan view of the stoker, together with the supporting closure and frame, which latter are shown partly in plan and partly in section; Fig. 6 is a vertical section on the line 6—6 of Fig. 5; Fig. 7 is an elevational view of the eye frame per se; Fig. 8 is a section on the line 8—8 of Fig. 7; Fig. 9 is an elevational view of the stoker-supporting closure per se; Fig. 10 is a section on the line 10—10 of Fig. 9; Fig. 11 is a front elevation of the stoker body frame per se; Fig. 12 is a vertical section on the line 12—12 of Fig. 11; Fig. 13 is a top plan view of the fuel-impelling member per se; and Fig. 14 is a section on the line 14—14 of Fig. 13.

Referring to the drawings, the improved stoker is shown as operatively applied to a kiln such as is used in the firing of brick, tile and various other ceramic articles. This kiln primarily comprises a cylindrical wall 1, spanned by a substantially spherical top or dome 2. The wall is pierced by a port 3 through which persons can readily pass when the kiln is cool and not in use, for the purpose of unloading fired articles and reloading the interior with so-called green or freshly molded shapes of brick, tile and the like. Through said wall also extend circumferentially spaced apertures or eyes 4, through which fuel is fed to the fires employed to heat the kiln, while beneath each of said apertures is another opening 5, through which ashes from said fires are drawn from time to time. The kiln wall is retained against appreciable radial expansion by means of bands 1; while the dome is pierced by the usual vents 2, used in cooling the kiln.

The lower part of each fire aperture 4 is characterized by a coking shelf 6, beneath which is a peep opening 7 for examining the condition of the fire without opening said closure, while above said fire opening is another opening 8 to admit additional air to aid combustion of gas rising from the fire upon the inwardly and downwardly sloping grate 9. The floor of each kiln is provided with radial rows of spaced outlet or exhaust ports 9', through which the hot spent gases are drawn after being in contact with the initially moist contents of the kiln, the necessary draft being created by a suitably located stack or chimney and submerged connecting ducts (not shown). In order to direct the hot air currents from each fire upwardly before it is drawn downwardly towards said exhaust ports, a rectangular baffle wall 10 is provided, surrounding and extending well above the level of each fire.

Each of the firing apertures is maintained in shape by a suitable arched brick structure, and into the outer end of this aperture in each case is secured a protective metal frame member 11, comprising a peripheral flange 12, which internally has the same outline as that of the fire aperture, while a second flange 13 extends radially outwardly but with sufficient curvature to conform to the outer surface of the kiln wall. Said frame member is secured in position by means of bolts 15 supported by suitably arranged metallic members 16 fastened to and forming a part of said wall, or by any other suitable means. Said last-mentioned flange 13 is provided upon one side with vertically spaced lugs 17, apertured to receive a pin or pins 17', to hingedly support a door or closure 18, through spaced apertured lugs 19, carried thereby. The flange might be said to be planular, for while it conforms to the strictly cylindrical shape of the outer surface of the kiln wall 1, the diameter of that surface is such that said flange radiates and lies substantially in a plane, as distinguished from a corrugated, wavy, or other more or less flat or irregular cross section.

The opposite side of said closure is provided with vertically spaced lugs 20, which straddle an apertured lug 21, carried by said frame member and through which a wedge or pin 22, passes, in order to normally secure said closure in positive closed position. Said closure is preferably hollow upon its inner side facing the fire, to receive suitable brick, cement, and/or other form of heat-insulating material 23, while around its periphery said closure is provided with a radially outwardly extending flange 24, which closely abuts against a flange 25, which is integral with and extends outwardly from said frame member. Said closure is provided in its lower central portion with a fuel opening 26, and it is in general above and upon the laterally opposite sides of this opening that the heat-insulating material 23 is located, for a purpose hereinafter described.

The outer surface of said closure is provided upon the laterally opposite sides of the opening 26, with apertured lugs 27, through which normally extend pins or wedges 28, for securing thereto the oppositely directed pairs of spaced lugs 29, carried by a stoker-supporting bracket 30. This bracket comprises a hollow, substantially rectangular flange 30', which extends through the aperture 26 in said closure and cooperates with the upper and laterally opposite sides thereof to secure said heat-insulating material in fixed position. A radially outwardly extending flange 31 abuts against the outer surface of said door adjacent to its opening, while a pair of parallel, vertically extending side walls 32 project forwardly, said last-named walls being connected at their outer ends by a yoke 33, and provided upon their lower edges with inwardly directed flanges 34.

Said yoke is provided with a bore 35, and the lowermost portion 31' of the flange 31 is provided with an aperture 36, while a vertically enlarged portion 34' of each of the flanges 34 is provided with spaced, aligned apertures 37, all being for purposes hereinafter described. A fuel feeding, reciprocatory member 38 comprises a central, planular body portion 39, provided with forwardly and laterally directed marginal flanges 40 and 41. This feeding member reciprocates upon the upper surfaces of the inwardly directed flanges 34 of the bracket 30, while its forward depending flange 40 slides upon the feed surface 40' of the closure 18. Extending rearwardly from the central portion of the feed member 38, is a piston rod 42, which extends loosely through the yoke bore 35, and is provided with a terminal pistonhead 43, which reciprocates within a cylinder 44, carried by said yoke. Extending through the outer end of said cylinder is a fluid pressure inlet port connected with a fitting 45, which comprises a petcock 46 and a connection for a flexible tube 47, leading from a suitable source of fluid pressure, which may be either manually or automatically controlled. A pressure release port 47' is provided in the forward end portion of said cylinder.

Forward movement of the feed member 38, under the force of air or other fluid pressure within said cylinder, is limited by a pair of depending lugs 48 having shoulders which contact with and are stopped by a rod 49, which is adjustably positioned in any desired pair of oppositely positioned apertures 37 in the bracket flanges 34, it being understood that any other suitable form of adjustable stop may be substituted therefor. The lower central portion of said feed member 38 is also provided with an integral depending extension 50 to which is attached one end of a coil spring 51, the opposite end of said spring being provided with a link chain 52, or other suitable form of irregular surfaced tension member adapted to adjustably engage an upstanding notched lug 53, carried by the rearward portion of a tensioning bracket 54, which at its forward end is detachably supported by the lower portion 31' of the flange 31 of the bracket 30, by means of a pin 36' passing through the aperture 36 therein. The rearward portion of said spring-tensioning bracket is supported by a U-shaped bracket 55, from the underside of the first bracket 30.

Between the lower portions of the side walls 32 of the bracket 30 is secured, by bolts 56 or the like, the relatively restricted lower end portion 57 of a fuel hopper 57'. This hopper is formed by and between upwardly extending side walls 58, a rearward sloping wall 59, and a vertical forward wall 60. The said forward wall is shorter at its lower end (Fig. 6) to permit fuel to flow freely forwardly from said hopper, both upon the upper surface 39, of the feed member 38, and upon the feed surface 40' of said bracket 30. The lower portion of the rearward sloping wall terminates above said feeding member, but fuel is prevented from passing from the hopper in that direction by a transversely angularly shaped scraper 61, the forward edge portion of which slidably engages the upper surface of the body portion 39 of said feed member, while its rear portion is pivotally supported by a rod or the like 62, the opposite ends of which extend between and are supported by the side walls 32 of said feeder and hopper-supporting bracket. In order to still further insure against escape of fuel rearwardly from said hopper, the upper rear edge of said scraper 61, is preferably provided with a flange 61', which by duplication upon the under side makes said scraper reversable.

In the operation of this invention, it is assumed that ordinary coal or other type of solid, or semi-solid fuel has been placed in the hopper 57', and that a fire had already been started upon the grate 9, with the kiln charged with green brick, tile, or other form of ceramic articles, and that the entrance port 3, has been sealed in the usual manner with brick and cement, or otherwise if preferred. Coal from within said hopper already lies, and has been degassified upon the coking shelf 6, the time has come when the fully coked fuel is required for the fire upon the grate, and the coke for that purpose must be replaced by fresh coal. Air or other fluid pressure, such as steam, is applied through the tube 47 into the cylinder 44, where the piston is forced forwardly and the feed member 38 is thereby similarly shifted. This indirectly pushes the coke upon said coking shelf upon the fire bed on said grate, directly pushing fuel upon the feeding surface forwardly of the feeder flange 40.

Upon cessation of the fluid pressure within said cylinder, the tensioned spring 51 returns said feeder member 38 to its normal retracted position (Figs. 5 and 6), and thereby permits fresh fuel from said hopper to gravitate towards and upon said feed surface 40' in front of the feeder flange 40, ready for the next operation of the feeder member. The approximate surface outline of the fuel beneath and forwardly of said hopper, just prior to operation of said feeder member is indicated by the broken line 63. Such an outline obviously differs slightly with each type of fuel, and the degree to which the fuel may be broken up or partially powdered, but to all intents and purposes the line referred to is fairly representative of that which commonly exists. This operation may be repeated as often as necessary, and in each instance fuel is prevented from following the feeding member rearwardly by the scraper 61.

The flexible tube 47, extending upwardly from the fitting 45, may be supported in any desired manner, but in the drawings (Fig. 3) it is shown as being connected through a swivel connection 64 to a pressure supply line 65, the fluid pressure from which is controlled by a suitably positioned valve 66. With this construction, in the case of a hingedly mounted door or closure, the flexible lower terminal portion of said tube is adapted to freely oscillate angularly with said closure, as it is opened and closed from time to time, without said tube extending unnecessarily far into the space around the kiln wall, and with minimum tendency to deteriorate, as would otherwise be the case from uncontrolled bending, flexing and possible kinking.

It should also be realized that instead of a reciprocatory, fuel-impelling member, a rotary screw or equivalent means may be employed, if preferred. Likewise, instead of said member being returned to its normal withdrawn position by means of a coil spring or similar resilient element, the same result may be accomplished by fluid pressure, simply by duplicating in general the structure which operates to initially propel said member forwardly. Similarly, instead of providing a variably positioned stop such as the crossbar 49 to arrest the forward motion of said impelling member, an even finer adjustment can be obtained by employing any well-known type of screw or equivalent adjustable means, which would be carried either by some available part of the bracket 30, or by a convenient portion of the impelling member itself.

Having thus described our invention, what we claim and desire to protect by Letters Patent of the United States is:

1. The combination of a kiln having a firing opening, with a frame element comprising a peripheral flange extending into said kiln opening and surrounding an opening in said frame, a planular flange limiting the movement of said first flange inwardly of said kiln opening, and an outwardly extending peripheral flange surrounding said frame opening; a hollow closure for said frame opening hingedly supported by said frame, comprising a peripheral flange extending loosely into said frame opening, and a planular flange sealing the space between said last-mentioned flange and the outwardly extending flange of said frame; said closure also having an opening; a stoker-supporting member demountably carried by said closure, and having an elongated peripheral flange extending through said closure opening substantially to the plane of the inner edges of the peripheral flange of said closure; and heat-insulating material substantially filling said closure above and upon the opposite sides of said elongated flange.

2. The combination of a kiln having a firing opening, a frame element surrounding said opening, a hollow closure for said opening hingedly supported by said frame and comprising a wall having an opening in its lower portion, a peripheral flange extending loosely into said frame opening and a planular flange sealing the space between said last-mentioned flange and said frame, a stoker-supporting member demountably carried by said closure and having an elongated peripheral flange extending through said closure opening substantially to the plane of the inner edges of the peripheral flange of said closure, and heat-insulating material substantially filling said closure outside of said elongated flange.

FRED M. MILLER.
ALFRED C. SHAPE.
WILLIAM H. McCLELLAND.